United States Patent [19]
Branch

[11] Patent Number: 5,125,513
[45] Date of Patent: Jun. 30, 1992

[54] APPARATUS AND METHOD FOR AUTOMATICALLY ASSEMBLING RANDOMLY ORDERED LAUNDERED STEMS IN A SELECTED ORDER

[76] Inventor: Thomas R. Branch, 725 Cedar Creek Way, Woodstock, Ga. 30188

[21] Appl. No.: 634,614

[22] Filed: Dec. 27, 1990

[51] Int. Cl.⁵ .............................................. B07C 5/02
[52] U.S. Cl. .................................... 209/3.3; 198/360; 198/370; 198/465.4; 209/583; 209/606; 209/937
[58] Field of Search ................ 209/3.3, 552, 583, 606, 209/706, 925, 937, 942; 414/13; 198/360, 370, 465.4

[56] References Cited

U.S. PATENT DOCUMENTS

| | | | |
|---|---|---|---|
| 3,151,730 | 10/1964 | Bunten | 198/370 X |
| 3,454,148 | 7/1969 | Harrison | 198/465.4 |
| 4,239,435 | 12/1980 | Weiss | 414/136 |
| 4,303,503 | 12/1981 | de Mimerand et al. | 209/3.3 |
| 4,693,460 | 9/1987 | Adamson et al. | 209/552 X |
| 4,907,699 | 3/1990 | Butcher | 209/3.3 |
| 5,005,691 | 4/1991 | Jennewein et al. | 198/465.4 |
| 5,058,750 | 10/1991 | Graese | 209/937 X |

FOREIGN PATENT DOCUMENTS

2421316 11/1974 Fed. Rep. of Germany ...... 209/583

Primary Examiner—Donald T. Hajec
Assistant Examiner—Joseph A. Kaufman
Attorney, Agent, or Firm—Jason A. Bernstein

[57] ABSTRACT

An apparatus and method are provided for sorting laundry. The method includes laundering a plurality of items each having a separable tag portion of a laundry ticket bearing bar coded identification data associating an item of laundry with a laundry ticket, arranging tickets for the plurality of items into a randomly ordered stack, and scanning bar coded identification data from the randomly ordered stack of tickets for the laundered items into a control computer. The method includes scanning identification data for each laundered item into the computer, placing the scanned items onto a rotating pickup assembly, and bringing collector arms, one at a time, toward the rotating pickup assembly. The method also includes removing the items, one at a time, from the rotating pickup assembly to the collector arms according to the identification data so that items may be assembled with the associated ticket without altering the rotational speed of the rotating pickup assembly.

36 Claims, 5 Drawing Sheets

Fig_1

APPARATUS AND METHOD FOR AUTOMATICALLY ASSEMBLING RANDOMLY ORDERED LAUNDERED STEMS IN A SELECTED ORDER

CROSS REFERENCE TO RELATED APPLICATIONS

The subject matter described in this application is related to the material disclosed in co-filed U.S. Pat. No. 5,114,187 "Bar Coded Laundry Ticket" by the present inventor.

TECHNICAL FIELD

This invention relates generally to laundry sorting equipment, and more particularly relates to an apparatus and method for automatically assembling a laundered item with an appropriate ticket.

BACKGROUND OF THE INVENTION

A commercial cleaner receives items to cleaned from a number of customers. Unfortunately, a commercial cleaner normally cannot profitably clean laundry or other items by handling items on a single customer basis. The cleaning process is more efficient when the full capacity of machines is used requiring several customer's item to be group together for cleaning. Thus, items from several customers may be grouped together and cleaned as a load to efficiently utilize cleaning equipment. As used herein the terms "cleaning" and "laundry" and their derivatives and counterparts refer to both dry cleaning (without water) and wet cleaning, and these terms may be used interchangeably to refer to both the act or process of washing and ironing and the things washed and the place where it is done.

While the items are being cleaned, for example, when a customer drops off a load of shirts to be laundered, the cleaner writes up a ticket giving the customer a portion thereof as a receipt. The cleaner keeps one portion of the ticket as his inventory and receipt and tosses the main portion of the ticket into a bag with the shirts. The cleaner may remove a separable portion of the ticket with an identification number and attach one of these separable portions to each of the shirts for inventory and tracking purposes. The cleaner operates a service business and it is his responsibility to receive items, clean them, and return them to the customer.

The cleaner receives the bags of laundry and tags each item to identify the individual customer by using the separable portion of the ticket. This is done prior to sorting the items for cleaning. In the case of shirts, the shorts may be divided into lots sufficient to efficiently fill a commercial washer which may hold a hundred shirts. Because these large washers hold so many items, it is imperative that each item have an identification tag so that it can be returned to the proper customer. The shirts are shorted and washed in lots of one hundred or so, but within each lot, the shirts are in no particular order. Before the shirts leave the cleaning area, they must be starched, ironed and assembled with the ticket with which they arrived. The shirts are ironed and they are hung on a rail according to their lot. When the entire lot is pressed and hung, the shirts are sorted by hand and assembled with the ticket that accompanied them. This process involves physically handling each shirt by looking at the separable tag thereon and placing that particular item on a rack with the ticket. The separable tags indicate how many pieces belong with that ticket. Accordingly, it will be appreciated that it would be highly desirable to be able to reassemble the prepared laundry with its ticket with a minimum amount of handling.

Another problem with the sorting process is that a worker must physically handle the separable tag to read the identification data which may consists of a four, five or even six or more digit number or combination of numbers and letters, creating an opportunity for error in reading the data. Even when being extremely careful, a worker is prone either to misread the identifying data or to transpose digits and thereby place a garment with the wrong ticket. The result of such an error is that a customer receives the wrong item or no item at all. Also, the separable portion of the ticket is constructed of paper impregnated with ink which sometimes deteriorates during the cleaning process making the data difficult to read. It is desirable to have identifying data which does not deteriorate in the cleaning process and remains crisp, clear and easy to read.

A time consuming element of the sorting process is the step of separating the lot of cleaned items and assembling them with the appropriate ticket, remembering that a single ticket may contain several items of cleaning. Presently, a worker picks the first item in the lot off the rack, looks at the identifying data thereon, places the item with the appropriate ticket, and proceeds to the next item in the lot. This represents three opportunities for worker error. Because the cleaned items cannot be maintained in any particular order in the machines during cleaning, they must be shorted by hand by visually checking and pairing numbers after cleaning. Accordingly, it will be appreciated that it would be highly desirable to unite each item in a lot with the appropriate ticket without manually handling each item at each step of the reassemble process.

Laundry sorting apparatus is disclosed in U.S. Pat. No. 4,239,435 which issued Dec. 16, 1980 to Donald J. Weiss and Bernard S. Speckhart, and U.S. Pat. No. 4,907,699 which issued Mar. 13, 1990 to R. E. Butcher and A. A. Henderson Jr. Weiss et al. discloses an apparatus and method for arranging a plurality of randomly arranged identifiable articles into a predetermined order. The apparatus includes a conveyor for releasably supporting the randomly arranged articles and for conveying the articles supported thereon past at least one receiving station arranged about the conveyor for receiving the articles. Identifying means are associated with the receiving station for identifying each article as it is conveyed past the receiving station. Release means responsive to the identifying means are provided for releasing the article identified by the identifying means from the conveyor means to the receiving station when the article identified is the next succeeding article in the predetermined order with respect to the articles previously received by the receiving station. Articles are only removed from the conveyor means when they are the next succeeding article in a predetermined order. The remaining articles will remain on the conveyor for subsequent passes past the receiving station. The method for arranging randomly arranged articles into a predetermined order comprises releasably supporting the randomly arranged articles on support means and moving the articles past at least one receiving station for receiving the articles. As each of the articles move past the receiving station, each article is released from the support means to the receiving station when the article is the next succeeding article in the predetermined order with respect to the articles previously received by the receiving station. The articles remaining on the support means continue moving past the receiving station until all of the articles on the support means are released to the receiving station.

Butcher et al. discloses a method and apparatus for sorting and arranging garments in a selected order which have been sequentially placed in an unordered sequence. The garments are identified by a marking affixed to each garment, and each garments arranged in its identified sequence on a sorting conveyor having a multiplicity of movable carriers each for receiving a garment. Identification signals are rearranged in a preselected order, and a plurality of arranged signals are assigned to each one of a corresponding plurality of pick-off mechanisms positioned along the sorting conveyor. A computer calculates bidirectional movement of the sorting conveyor to minimize conveyor movement for positioning a garment for pick-off in its proper sequence by a respective one of the pick-off mechanisms. The conveyor is driven in a bidirectional mode to properly position the garment, and a pick-off mechanism is activated to remove the garment from the sorting conveyor and position the garment on an unloading conveyor. Each conveyor pick-off apparatus includes a fluid-powered cylinder inclined downward toward the sorting conveyor, and a drive unit for closing the gripper mechanism.

Unfortunately, the apparatus of Butcher and Weiss is designed for large conveyors capable of holding a thousand or more garments and accordingly requires a large amount of floor space in the laundry or garment handling facility. Also, a twelve digit or longer garment identification number may be required to ensure each garment is routed to where it belongs. These systems are designed for use with identification labels permanently attached to the garments and are not easily adapted to items without these permanent labels or items without the same complex numbering system. Understandably, it will be appreciated that it would be highly desirable to have a laundry sorting apparatus that is compact and does not require an enormous amount of floor space. It is also desirable to have a laundry sorting apparatus that is efficient to use on small lots on the order of a hundred items or so as is typically encountered in laundry operations.

Another problem with conveyor systems is that the conveyors operate in finite steps with the aid of a stepping motor, and stop for removal of garments. The powerful stepping motors required can be expensive, and can also start and stop with jerky steps causing the garments to sway and interfere with one another. The swaying motion of the garments causes problems when neighboring items are handled in succession. Accordingly, it will be appreciated that it would be highly desirable to have a sorting system which operates in a continuous motion and which prevents the garments from swaying.

SUMMARY OF THE INVENTION

The present invention is directed to overcoming one or more of the problems set forth above. Briefly summarized, according to one aspect of the present invention, a method for sorting laundry comprises laundering a plurality of items each having a separable tag portion of a laundry ticket bearing bar coded identification data associating an item of laundry with a laundry ticket, arranging tickets for the plurality of items into a randomly ordered stack, and scanning bar coded identification data from the randomly ordered stack of tickets for the laundered items into a control computer. The method includes scanning identification data for each laundered item into the computer, placing the scanned items onto a rotating pickup assembly, and bringing collector arms, one at a time, toward the rotating pickup assembly. The method also includes removing the items, one at a time, from the rotating pickup assembly to the collector arms according to the identification data so that items may be assembled with the associated ticket without altering the rotational speed of the rotating pickup assembly.

The present invention utilizes a bar code on the separable member attached to each item of laundry scanned into a computer which controls movement of a sorting machine that automatically assembles the proper laundered items with the appropriate ticket. A feature of the present invention is bar coded laundry tickets with separable members that are attachable to the laundry items without the use of metal staples. An advantage of the staple free laundry tickets is the saving of time when attaching the separable portions of the ticket to the items to be cleaned. Staples have a tendency to catch in the threads of garments causing damage to the garments. The laundry ticket of the present invention does not use staples and has no metal parts to damage items of laundry. The staples also occasionally injure workers causing a loss of productivity.

The present invention also saves labor be eliminating the need for a worker to physically read the identifying data from each separable ticket member in a lot of laundry. The present invention reduces errors by eliminating the need for a worker to manually examine the identifying data on each item thereby reducing the possibility of human error in this step of the sorting process.

It is an object of the present invention to provide a method for automatically assembling laundry. A sorting machine automatically assembles each item in a lot of laundered items with an appropriate ticket whether there is one item per ticket or several items per ticket. The sorting machine operates automatically without the need for a worker to physically examine the identifying separable ticket on each item. According to the method one to six items of laundry from a randomly ordered group is automatically assembled with the ticket which accompanied the items to the laundry facility. Items are moved from one location to another according to the method without pausing to physically transfer the items.

It is an object of the present invention to provide an apparatus for automatically assembling laundry. It is a feature of the present invention that this objective is achieved by a sorting machine that automatically assemblies each item in a lot of laundered items with an appropriate ticket. It is an advantage of the present invention that the sorting machine operates automatically without the need for a worker to physically examine the identifying separable tag on each item.

Another feature of the present invention is transfer mechanism which physically transfers scanned items to a rotating carrier assembly for delivery to a collector arm assembly. The delivery is accomplished without stopping the rotating carrier assembly which gives the advantage of a transfer in minimum time. Also, a the rotating carrier assembly has a plurality of fingers so that a finger is ready to receive an item as soon as a delivery is made to thereby minimize the time required to assemble the items.

Another feature of the present invention is a gear box to control the rotational speed and direction of the rotating carrier assembly. The gear box has a torque reducing coupling for controlling the torque delivered to a rotating carrier assembly so that the carrier ceases to rotate when a preselected rotational resistance is encountered to thereby prevent damage to the carrier assembly and to protect any garments on the carrier assembly.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
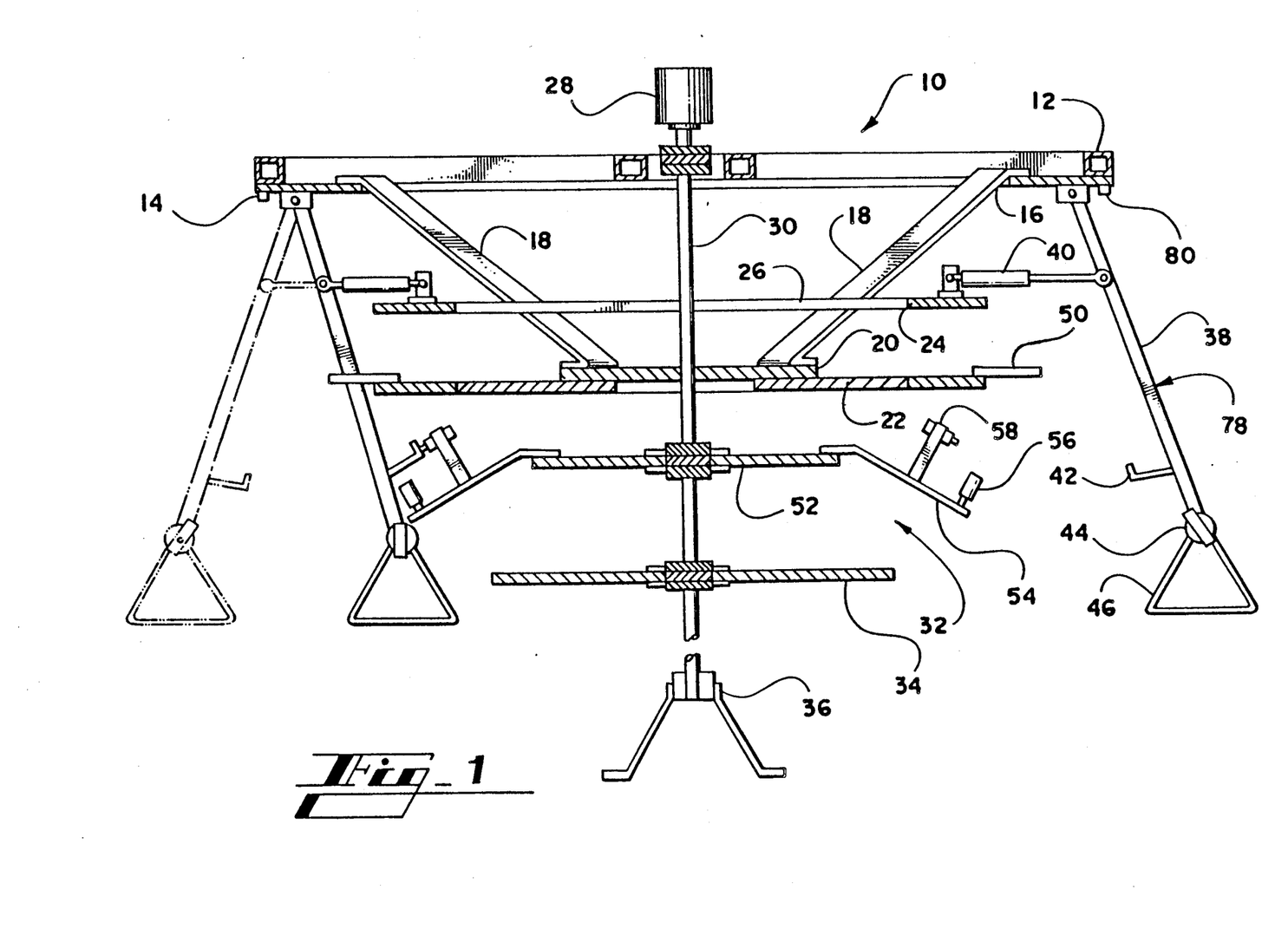
FIG. 1 is a diagrammatic cross sectional view of a preferred embodiment of a laundry sorting apparatus constructed in accordance with the present invention and illustrating a collector arm assembly and a rotating carrier assembly.

Referring now to the drawings, in which like numerals indicate like elements throughout the several figures, FIG. 1 illustrates a laundry sorting apparatus 10. The sorting apparatus 10 may be suspended from the structural members of a roof system or may be supported from below by vertical columns or the like attached to the sorting apparatus. The frame of the sorting apparatus 10 includes horizontally oriented I-beam or box beam structural members connected together to form a rectangular or circular grid or lattice 12. The frame also includes a top frame member 14 which is preferably a rectangular plate with a circular central opening 16. The top frame member 14 is preferably bolted to the grid 12 but may be connected by welding or the like. When suspended from the ceiling, the sorting apparatus 10 may be suspended by a connection to the gridwork 12, top plate 14, or both. Similarly, when supported from below by columns, the sorting apparatus 10 may be supported by a connection to or contact with the gridwork 12, top plate 14, or both. The top frame member 14 and other frame members are preferably constructed of steel, but may be constructed of aluminum other strong, rigid, durable materials.

The frame also includes vertical frame members 18 which are elongate members that have one end attached to the either the grid 12, top frame member 14, or both by bolts, welding or the like. The other ends of the first vertical frame members 18 are connected to a small plate 20 preferably of circular configuration with a circular opening centrally located therein. A spacer plate 22 that is a circular ring is attached to the small plate 20 by bolts or the like. This two-piece construction makes assembly easier. The vertical frame members 18 are connected along their middle portions to a stationary plate 24 which also has a circular configuration with a circular opening 26 therein. The top frame member 14 is at a higher elevation and extends over the stationary plate 24. The stationary plate 24 is at a higher elevation than the spacer plate 22, and is intermediate the top plate 14 and spacer plate 22.

A motor 28 is supported by the grid 12 at a location above the top plate 14. The motor 28 drives a shaft 30 which has a carrier assembly 32 and stopper plate 34 mounted thereon and rotatable with the shaft 30. The shaft 30 extends from the motor 28 through the central openings 16, 26 of the top plate and stationary plate 14, 24, respectively. The shaft 30 also extends through the central openings of the small plate 20 and the spacer plate. The carrier assembly 32 is positioned on the shaft 30 at a location below the spacer plate 22 and above the stopper plate 34. The lower end of the shaft 30 may be received by a floor support unit 36 which helps keep the rotation of the shaft 30 true, and protect the shaft 30 from lateral movement caused by inadvertent pushing or moving of the carrier assembly 32 or stopper plate 34.

The motor 28 may be a dc motor that rotates the shaft 30 continuously, or may be a stepping motor that rotates the shaft 30 in finite steps or increments. Preferably, the shaft 30 is connected to the motor 28 by a torque reducing coupling and gearbox. The gearbox will drive the carrier assembly 32 as hard as it can. If there is an occasional jam, the carrier assembly 32 will try to continue to turn which is undesirable. A torque reducing coupling shaft is adjustable to provide just enough torque to turn the the carrier assembly 32 and bring the heaviest garment around without slipping. But, if there is the slightest bit of binding anywhere or any jamming at all, the torque reducer will slip to prevent damage.

Figure 2:
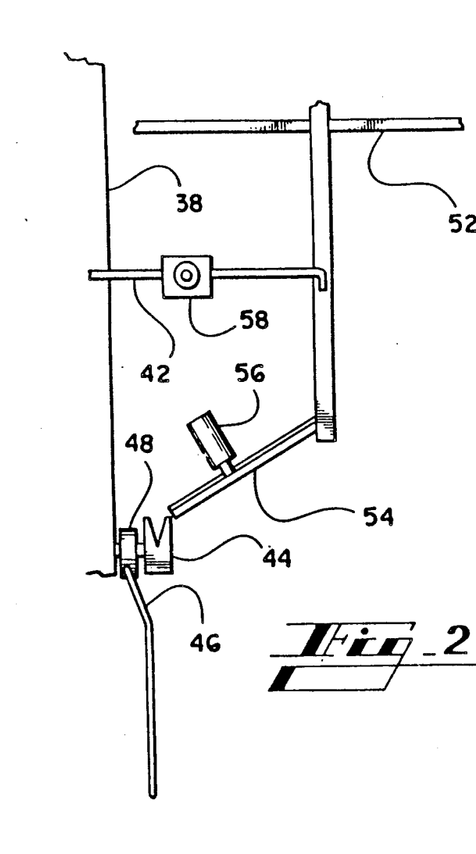
FIG. 2 is a diagrammatic view of the collector arm assembly and rotating carrier assembly of FIG. 1 illustrating the interaction of the two assemblies.
Figure 3:
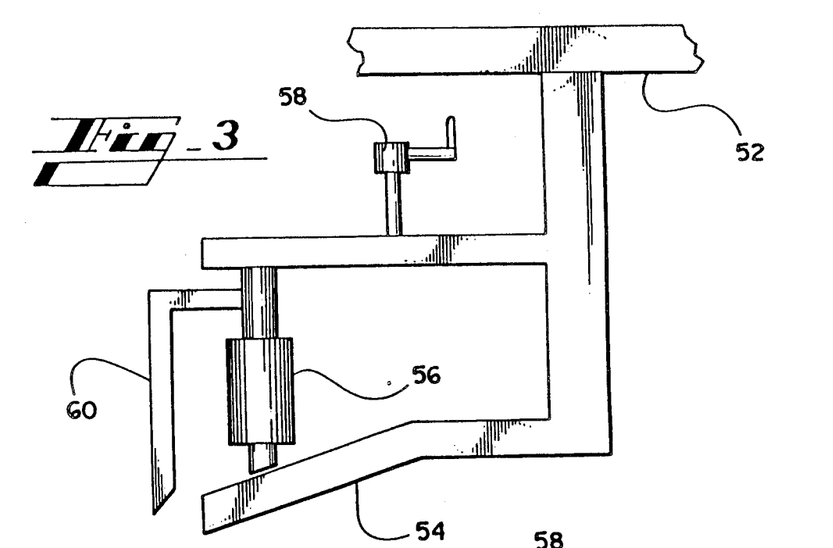
FIG. 3 is a somewhat enlarged diagrammatic view of the finger portion of the rotating carrier assembly FIG. 1.
Figure 4:
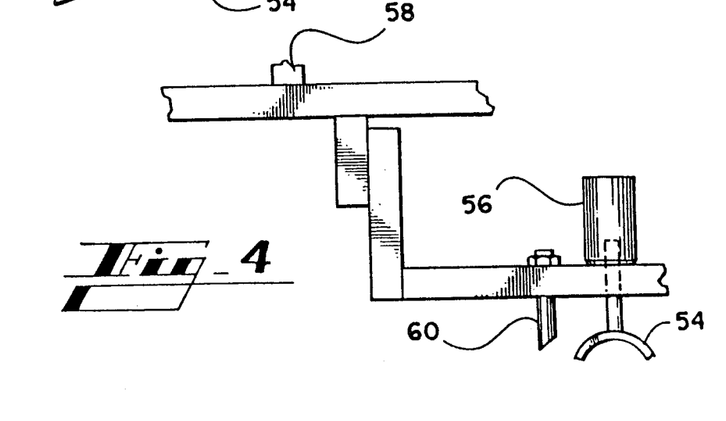
FIG. 4 is diagrammatic left end view of the finger portion of the rotating carrier assembly of FIG. 3.

Referring to FIGS. 1 and 2, a sorting and collecting arm 38 is hingedly connected to the underside of the top frame plate 14 near the outer periphery. There are a number of sorting arms 38 positioned about the outer periphery of the top frame member 14 at spaced intervals in a circular pattern with a few arms 38 omitted to provide easy access to the rotating carrier assembly 32 during operation. The arms 38 are arranged in a circular pattern but do not complete the circle; instead, they cover only about three quarters of a circle to provide access to the carrier assembly 32. Each arm 38 is an elongated member preferably constructed of metal with a rectangular cross section. It will be understood that other materials and other cross sectional configurations could be used effectively, but a rectangular cross section gives great strength and rigidly and facilitates the hinged connection. Each arm 38 is moveable between a neutral position and an energized position. At the neutral position (shown in phantom in FIG. 1), the collector arm 38 is positioned away from the carrier assembly 32, and preferably is moved past the vertical to prevent interference of laundry on the carrier assembly 32 with the arm 38. At the energized position, the collector arm 38 is moved from the neutral position toward the rotating carrier assembly 32.

Each collector arm 38 has an air cylinder 40 attached to it for effecting movement between the neutral and energized positions of the arm 38. The cylinder end of the air cylinder 40 is connected to the stationary plate 24 and the rod end is attached to the collector arm 38 by a pivotal connection. Operation of the air cylinder 40 is preferably controlled by a valve that will meter air for smooth operation of the collector arm 38 between the neutral and energized positions. Alternatively, instead of an air cylinder 40, a fluid motor or electric motor or solenoid plunger could be used to effect movement of the collector arm 38. The air cylinder 40, however, has the advantage of operating without electrical sparks or oil that can leak.

Still referring to FIGS. 1 and 2, positioned along each arm 38 is a finger 42, and further along the arm 38 is a catchy, latch or head 44 which ultimately receives the sorted laundry. The finger 42 is preferably a piece of metal attached to the arm 38 with its free end bent upward exposing a surface for interaction with the rotating carrier assembly 32. Working in conjunction with the head 44 is a stabilizer 46 which restricts movement of laundered items held by the head 44. It is important that any laundry held by the head 44 not move in a manner that will interfere with movement of its associated arm or a nearby arm during operation. The head 44 is a block of material with a V-shaped slot cut therein with the legs of the V extending in a direction parallel to the radius of the motor shaft 30. The head 44 is preferably connected to the arm 38 by a threaded member which fixes the head 44 in position relative to the arm 38. A spacer 48 is held in position by the threaded member between the arm 38 and the head 44 and is free to pivot about the threaded member. The stabilizer 46 attaches to the spacer 48. The stabilizer 46 is a piece of rigid wire generally formed in a triangular shape similar to a clothes hanger to prevent movement of a hanger held by the head 44 in a direction tangential to the radius of the shaft 30, but to permit movement radially.

Referring to FIG. 1, the spacer plate 22 has a plurality of spacer assemblies 50 positioned around the periphery of the spacer plate 22. Each spacer assembly 50 contains first and second spacer elements which may be constructed of a synthetic resin, metal or other material. The first and second elements of the spacer assembly 50 are preferably bolted to the spacer plate 22 and are spaced from one another a distance sufficient to allow easy ingress and egress of the sorting arms 38. A synthetic resin is preferred for the construction of the spacer assembly 50 so as not to create precipitous wear when there is contact between the first and second spacer elements and one of the sorting arms 38 during operation. The first and second spacer elements of the spacer assemblies 50 are also spaced sufficiently close to guide the sorting arms 38 during operation and hold them steady.

The stopper plate 34 intercepts the garment on the stabilizer 46 on its inward journey to limit the motion of any garment placed on the head 44 and held against the stabilizer 46. It is desirable to limit the motion of garments held by the head 44 to prevent interference with other collector arms 38 during operation.

Now referring to FIGS. 1-4, the rotating carrier assembly 32 includes a carrier plate 52 attached to the motor shaft 30 and rotatable therewith in a direction from left to right as viewed in FIG. 1 which is counterclockwise as viewed from the top. Attached to the carrier plate 52 are a plurality of carrier fingers 54 which may be attached directly to the carrier plate 52 or attached thereto via brackets. The carrier plate 52 is a flat plate horizontally oriented, and the carrier fingers 54 extend angularly downwardly therefrom at an angle of about thirty degrees from the horizontal. The angle is sufficient for a garment on a hanger to slide freely thereon when the garment is being removed. The carrier finger 54 preferably has a flat surface, but a round surface can be used.

Associated with each carrier finger 54 is a solenoid 56 and a proximity switch 58. The proximity switch 58 is operated by the finger 42 of the collector arm 38 as the collector arm 38 moves from its neutral position toward its energized position which brings the finger 42 near the proximity switch 58. When the proximity switch 58 operates, it activates the solenoid 56 drawing the solenoid plunger upward into the body of the solenoid. In its deenergized condition, the solenoid 56 has its plunger resting against the surface of the carrier finger 54 to prevent a garment on a hanger from sliding off the finger 54. When energized, the plunger of the solenoid 56 retracts allowing the garment on the hanger to slide from the finger 54. The finger 54 has a curved surface to fit the curved contour of a hanger thereby making it easier for the solenoid plunger to clear the hanger. A flat surface would leave a gap between the surface and the hanger requiring the plunger to travel a greater distance to clear the hanger. The solenoid 56 and proximity switch 58 may be mounted directly on the carrier plate 52, or may be mounted on the bracket that holds the carrier finger 54, or may be mounted together on a separate bracket or individual brackets.

There is also a finger guide stop 60 positioned in front of the finger 54 to prevent a hanger with a garment from overshooting or jumping off of the head 44 of the collector arm 38. The finger guide stop 60 has a shaft or pin to deflect garments at an angle. The angle is measured from the horizontal downward, and is about thirty degrees. The pin is chiseled to provide clearance for the arm 38. Each collector arm head 44 is designed to hold a maximum of six racks with garments. As the head 44 fills with hangers, the movement of the collector arm 38 may be influenced slightly, and as the V groove fills with hangers, it is possible for a hanger exiting from the finger 54 to either bounce out of the V groove if it slides too quickly or overshoot the V groove. The finger guides stop 60 is positioned to intercept the hanger and guide it to the V groove so that it does not bounce off of or overshoot the head 44.

Figures 5, 6, 7:
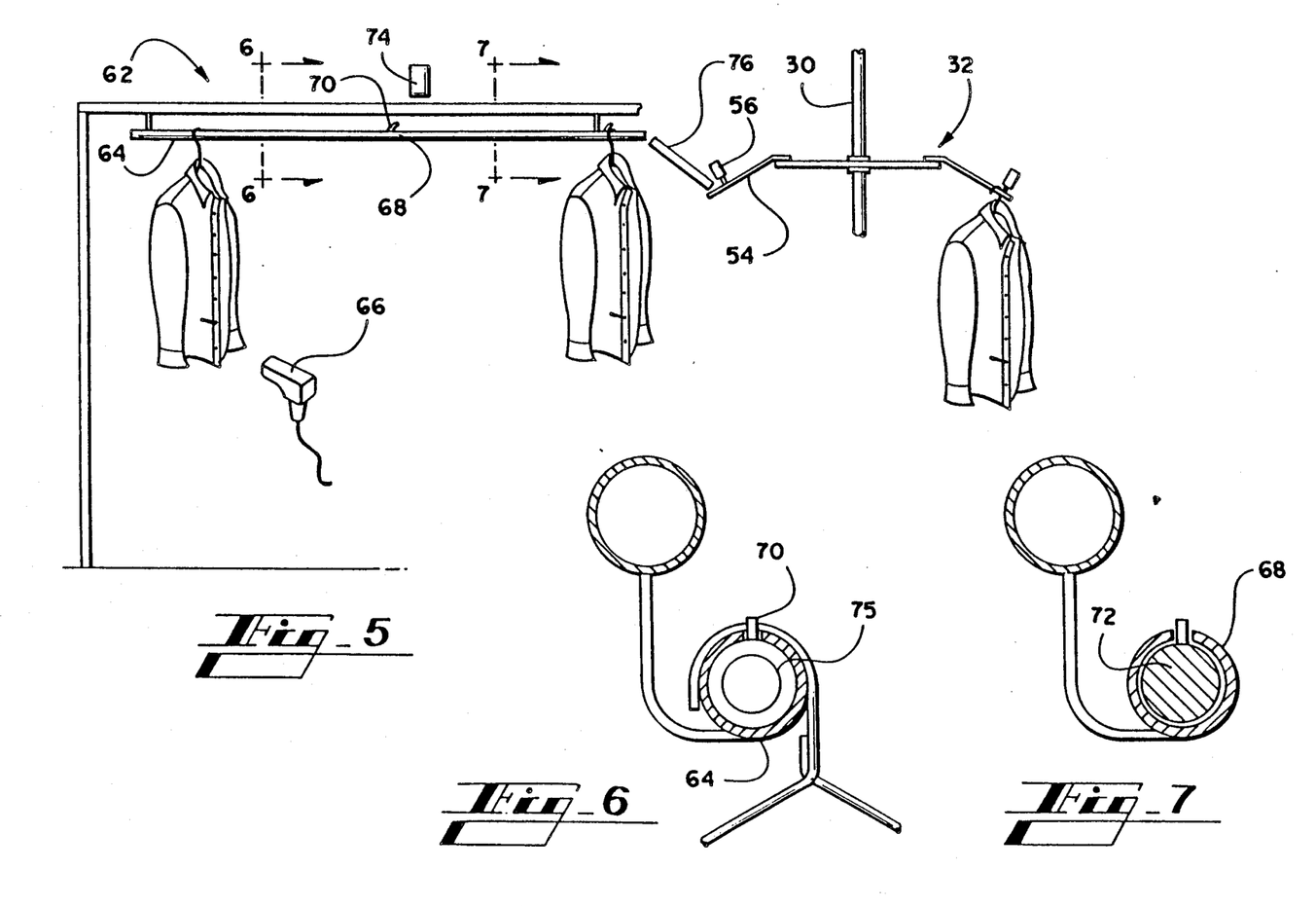
FIG. 5 is a diagrammatic view of a rail and supporting structure for delivering inspected garments to the laundry sorting apparatus of FIG. 1.
FIG. 6 is a sectional view of the rail taken along line VI—VI of FIG. 5.
FIG. 7 is a sectional view of the rail taken along line VII—VII of FIG. 5.

Now referring to FIGS. 5-7, a rail 62 is illustrated that has a horizontal bar divided into two portions. A first portion 64 of the horizontal bar 62 provides a space for the laundered garments to be hung on hangers to be inspected. After the garment is visually inspected, the separable portion of the laundry ticket containing bar coded information is read by a hand held scanner 66. Such a bar coded laundry ticket is disclosed in U.S. Pat. No. 5,114,187, which is incorporated herein by reference. Each scanned garment is then pushed by the operator from the inspection area 64 of the bar 62 onto a ramp area 68 of the bar 62. At the beginning of the ramp area 68 there is a ramp 70 which will elevate the hanger with the garment approximately a quarter inch off the rail 62 and drop it back down. The ramp portion 68 is a split rail configuration with a slider 72 inside that moves under the power of an air cylinder 75. A pin on the slider 72 protrudes upwards to engage the hanger after the hanger drops from the ramp 70. The air cylinder will drive the slider 72 and the hanger. The slider 72 under the control of the air cylinder will deliver the hanger to a carrier ramp 76 that is attached to the rail 62 and provides an inclined surface for the hanger to slide along to be picked up by a finger 54 of the rotating carrier assembly 32. As is apparent, the rail 62 is at a higher elevation than the carrier assembly 32, and is at a height sufficient for the carrier ramp 76 to be inclined enough for the hanger to slide freely thereon.

Referring to FIG. 1, the collector arms 38 may be equipped with spring clips 78 for holding a laundry ticket so that the garments associated with that ticket can be reassmbled with the ticket. Each carrier arm 38 may also have a light 80 which alerts the operator when all garments for the arm have been collected. Also, an infrared light 74 can be associated with the ramp area 68 of the rail 62 to detect when a hanger is present to be delivered to the carrier assembly 32.

Figure 9:
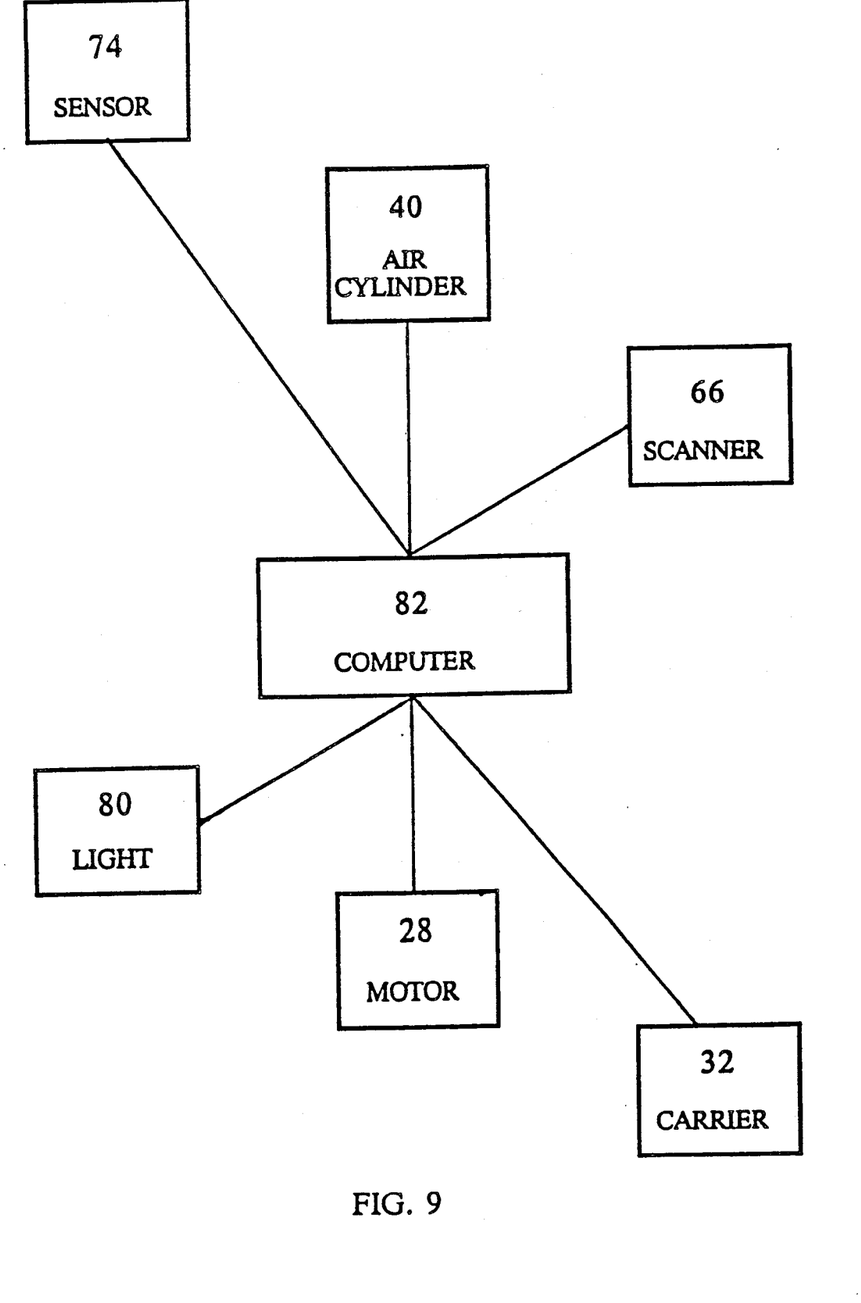
FIG. 9 is a block diagram illustrating elements of the laundry sorting apparatus of FIGS. 1-7 under control of a central computer.

Referring to FIGS. 1 and 9, the apparatus is preferably under control of control computer 82. The computer 82 receives information from the scanner 66, visual detection device 74, and other sources to control movement of the collector arms 38.

Operation of the present invention may be illustrated with reference to FIGS. 1-9 by following items of laundry through a laundry cycle from the beginning wherein a customer deposits soiled items with a local cleaner. For example, a customer brings in a suit and three shirts to be cleaned. The cleaner writes a separate ticket for the shirts which are to be wet cleaned with the ticket indicating the number of shirts. The cleaner writes a ticket with three separable parts so that each shirt may be tagged with a separable portion of the ticket containing identification information matching the tagged item with the ticket. The cleaner writes a ticket with three parts so that each shirt may be tagged with a separable portion of the ticket containing identification information matching the separable portions of the ticket with the ticket so that the shirts may be reunited with the ticket for ultimate delivery to the customer. The cleaner deposits the items to be cleaned with the respective tickets into a laundry bag which is then transported to the cleaning arena.

The cleaning arena may be on the premises with the local cleaner or may be a separate facility where all the branches of a particular cleaner send their items, or it may be a wholesale cleaner who cleans items for several different local cleaners. In any event, in the cleaning arena the dry cleaning goes to one area and the wet cleaning goes to a different area. Let us follow the wet cleaning to illustrate the present invention.

The shirts are received at block 84 (FIG. 8) where they are tagged with the separable portions of the laundry ticket if they have not been tagged previously. Once the identification tags are attached to the shirts, the three shirts are thrown into a pile with many other shirts to make a load for the machine being used. Typically a machine will accommodate a hundred or so shirts. A machine load of shirts is referred to as a lot and is given a lot number for identification purposes. The shirts are assembled in lots for the washer at block 88. At block 88 information from the ticket can be input to the central computer 82 for inventory and control purposes. Such information can identify the customer and the ticket numbers for that customer, for example. The laundry tickets for the shirts in the lot are arranged in a pile in a random order and data is entered into the computer 82 which will remember the order in which the tickets are entered. At this point the computer 82 knows every ticket in the cleaning facility, the number of items per ticket, the lot number of the tickets, and the order of the tickets in the lot.

Figure 8:
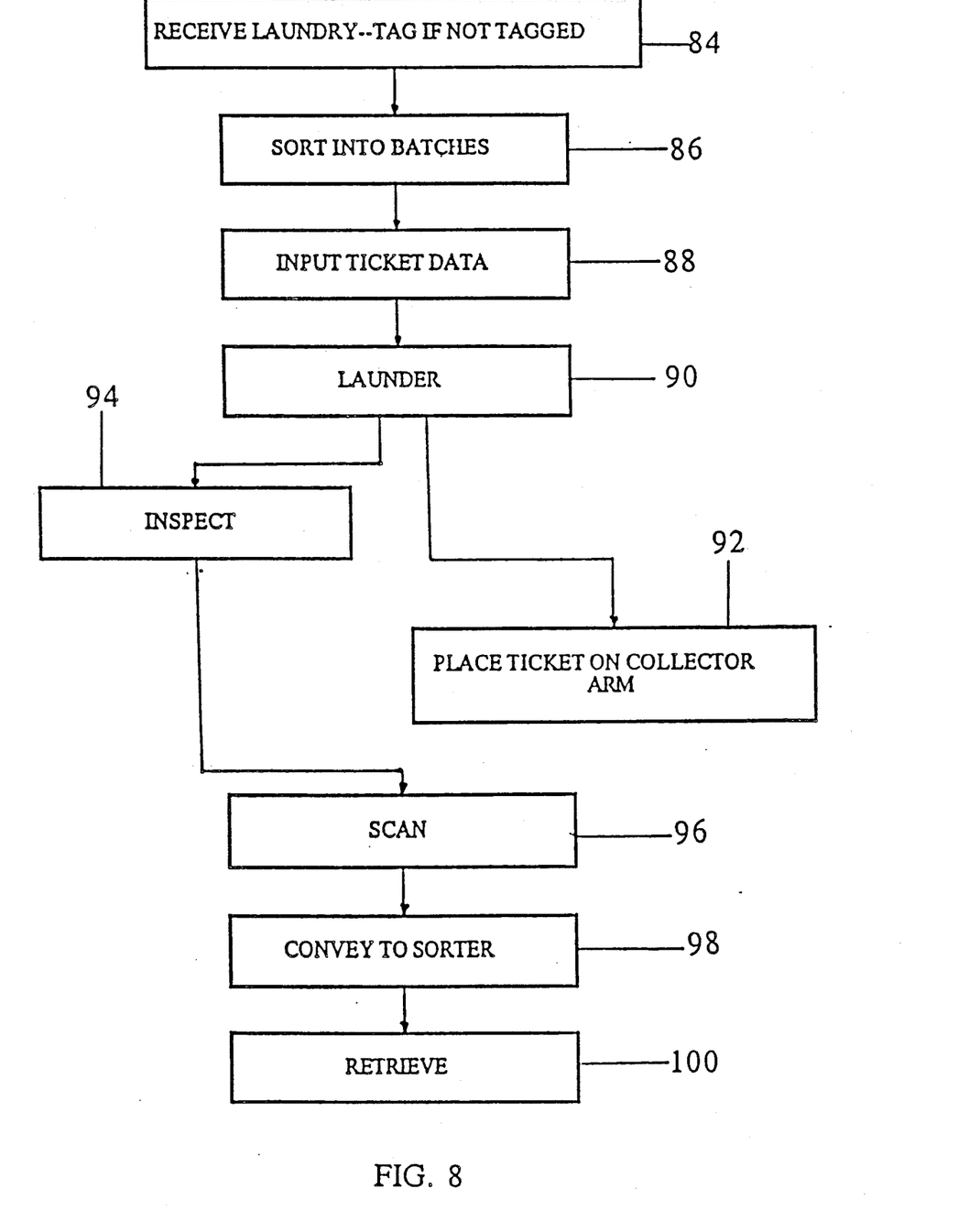
FIG. 8 is a flowchart illustrating the steps involved in sorting laundry with the laundry sorting apparatus of FIGS. 1-7.

After the shirts are washed and ironed at block 90, they are placed on hangers and put on a rail 62 at block 94, and the tickets may be placed on the collector arms 38 via the spring clips 78. The entire lot is hung on rail 62 for inspection to detect laundering imperfections, broken buttons and the like. If the shirts are acceptable, they are handled by an operator at block 96 who would ordinarily look at the identification data on the separable portion of the ticket attached to the shirt and match that item with its ticket by physically reading the tag on each shirt in the lot, and matching them by physically moving them and placing them with the appropriate ticket.

With the present invention, the identification data in bar coded form is read from the laundry ticket by a scanner 66 at block 96 which inputs the data to the central control computer 82. The control computer 82 will remember the identification number of the ticket and the number of items associated with that ticket.

When the scanning operation is completed, the operator with the free hand can slide the shirt along the rail 62 to be conveyed automatically at block 98 to the sorting apparatus 10. The shirt pushed along the rail 62 by the operator is engaged by the slider assembly 72 which pushes the shirt along the rail 62 with the aid of the air cylinder 75 and deposits it onto a waiting finger 54 on the rotating carrier assembly 32. In actual operation very little time is required for a skilled worker to inspect for laundering imperfections and broken buttons and slide the shirt along the rail 62. The continuously rotating carrier assembly 32 picks up each shirt as it is dropped off by the slider assembly, and carries it along as the carrier 32 rotates. The operator works with his back to the sorting apparatus 10 to minimize distractions. Also, parts of he apparatus can be hidden from view by a shield mounted on the framework to further minimize distractions. A guard rail can mounted on the floor to prevent the operator from backing into the sorting apparatus.

Now, the carrier arms 38 are operated in response to output signals from the control computer 82 which receives the input data from the stack of randomly ordered laundry tickets and assigns a collector arm 38 to each of the tickets in the order in which they appear in the stack for reassembly of the shirts with the correct ticket at block 100. At any point in time the computer 82 knows which of the collector arms 38 is associated with each of the tickets in the stack. As the shirts are carried by the rotating carrier assembly 32, the control computer 82 causes the air cylinder 40 to operate bringing the collector arm 38 in toward the rotating carrier assembly 32 at the proper time. As the collector arm 38 approaches the carrier assembly 32, the proximity switch actuator 42 on the collector arm 38 causes the proximity switch 58 on the carrier assembly 32 to operate thereby energizing the solenoid. The solenoid retracts its plunger allowing the garment to slide down the inclined ramp of the finger 54 of the carrier assembly 32 and drop onto collector head 44 of the carrier arm 38.

As mentioned, ideally, only one shirt is on the rotating carrier 32 at a time. The carrier assembly 32 rotates at a speed such that it makes one revolution about every six seconds so there is a maximum time required to remove a shirt from the rail to the collector arm head 44 of six seconds or so. In actual operation, as soon as the shirt is transferred from the carrier assembly 32 to the collector arm 38, a carrier assembly finger 54 is available to receive another shirt so that an entire revolution of carrier assembly 32 is not lost—only the time required for next available carrier assembly finger 54 to come into the vicinity of the rail 62. This accelerates the process of assembling the laundered items.

The ticket we are tracking in this example contains three shirts. After the first shirt is deposited on the collector arm head 44, the next shirt on the rail 62 is dropped onto the carrier assembly finger 54 and deposited in its proper place. When the second shirt in the group being tracked is deposited on the finger 54, it also travels about until it is picked off by a collector arm 38. It has been found that the carrier finger deflector 60 is useful for deflecting items being removed from the finger 54 to the collector head 44. The deflector 60 deflects the hanger as it leaves the finger 54 on its way to the collector arm head 44 forcing it into the V-groove.

It will now be appreciated that there has been presented an apparatus and method for sorting laundry which enables a launderer to reassemble the prepared laundry with its ticket with a minimum amount of handling. The laundry ticket has bar coded identifying data which does not deteriorate in the cleaning process and remains crisp, clear and easy to read. Each item in a lot is reunited with the appropriate ticket without manually handling each item at each step of the reassembly process as was done in the past.

The apparatus for assembling laundry includes a frame and a rotating pickup assembly attached to the frame. A computer mean receives bar coded data signals and delivers control signals. Means are provided for scanning bar coded identification data from a randomly ordered stack of laundry tickets into the computer means with each ticket in the stack of randomly ordered laundry tickets having a separable tag portion bearing bar coded identification data associating each laundry ticket with at least one item of laundry. The apparatus includes a rail for hanging the laundered items and means for scanning bar coded identification data for each item on the rail into the computer. The apparatus also includes means for automatically delivering the laundered items one at a time from the rail to the rotating pickup assembly, a plurality of collector arms attached to the frame and movable toward and from the rotating pickup assembly in response to signals from the computer means, and means for removing the items from the rotating pickup assembly to the collector arms according to the identification data so that items may be assembled with the associated ticket without altering the rotational speed of the rotating pickup assembly.

The method for assembling laundry includes receiving a plurality of groups of items to be laundered and ticketing each group of items with a single ticket identifying the group and specifying the number of items in the group. The ticket has a number of separable tags equal to the number of items in the group, and the ticket and separable tags each have identification data. The method also includes tagging each item in each group with one of the separable tags from the ticket for the group, arranging several groups of the plurality of groups into a lot for cleaning; arranging tickets for the lot into a randomly ordered stack; and inputting identification data from the randomly ordered stack of tickets for items in the lot into a control computer. The items in the lot are laundered, placed on individual hangers and hung on a rail for inspection. The method includes inputting identification data for each item on the rail into the control computer, associating the randomly ordered stack of tickets with collector arms of a sorting apparatus with one ticket per arms with the tickets kept in the order in which they appear in the stack of tickets. The method further includes automatically delivering items from the rail to a rotating pickup assembly, bringing the collector arms toward the rotating pickup assembly in response to a signal from the control computer and removing the items from the rotating pickup assembly to the collector arms according to the identification data so that each group of items is assembled with its corresponding single ticket.

The laundry sorting apparatus is compact and does not require an enormous amount of floor space. One model had 30 collector arms connected to a square top frame member 78 inches across, or about 42 square feet. Because the collector arms span 108 inches and extend beyond the perimeter of the top frame member 64 square feet of floor space are required. The sorting apparatus is also efficient to use on small lots on the order of a hundred items or so as is typically encountered in laundry operations. The sorting apparatus operates in a continuous motion which prevents the garments from swaying.

The present invention utilizes a bar code on the separable member attached to each item of laundry that is scanned into a computer which controls movement of a sorting machine that automatically unites the proper laundered items with the appropriate ticket. It saves labor by eliminating the need for a worker to physically read the identifying data from each separable ticket member in a lot of laundry. The present invention reduces errors by eliminating the need for a worker to manually examine the identifying data on each item thereby reducing the possibility of human error in this step of the sorting process.

While the invention has been described with reference to laundry operation, it is apparent that the invention is easily adapted to other operations where sorting of garments is done, such as uniform rental operations, for example.

While the invention has been described with particular reference to a preferred embodiment, it will be understood by those skilled in the art that various changes may be made and equivalents may be substituted for elements of the preferred embodiment without departing from invention. For example, the invention has been described with reference to a single lot, load or group of laundered items, but it is equally as applicable to multiple lots, loads or groups. In addition, many modifications may be made to adapt a particular situation and material to a teaching of the invention without departing from the essential teachings of the present invention.

As is evident from the foregoing description, certain aspects of the invention are not limited to the particular details of the examples illustrates, and it is therefore contemplated that other modifications and applications will occur to those skilled the art. For example, the invention has been described with pneumatic controls, but electrical or hydraulic controls could be used. Also, the invention has been described with particular reference to a dc motor, but a stepping motor can be used. With a stepping motor, the finger 42 and proximity switch 58 would not be needed to time the operation of the solenoid 56 because the timing and operation could be under the control of the computer 82. The computer 82 can remember the location of each carrier finger 54 and collector arm 38 and key operation to steps of the stepping motor. It is accordingly intended that the claims shall cover all such modifications and applications as do not depart from the true spirit and scope of the invention.

I claim:

1. An apparatus for assembling laundry, comprising:
   a frame;
   a plurality of collector arms attached to said frame;
   a rotating pickup assembly attached to said frame;
   computer means for receiving data signals and delivering control signals;
   means for inputting identification data from a randomly ordered stack of laundry tickets to said computer means;
   means for inputting identification data for each laundered item to said computer means, said computer means remembering the order in which items are input;
   means for automatically placing said laundered items onto said rotating pickup assembly, said laundered items each having a separable tag portion of a laundry ticket bearing identification data associating an item of laundry with one of said laundry tickets in said randomly ordered stack of laundry tickets;
   means for automatically bringing said collector arms, one at a time, toward said rotating pickup assembly for receiving a laundered item;
   means for automatically removing said laundered items from said rotating pickup assembly according to the identification data so that each group of items is assembled with its corresponding ticket without altering the speed of said rotating pickup assembly.

2. An apparatus, as set forth in claim 1, wherein said plurality of collector arms are hingedly connected to said frame member and moveable toward and from said rotating pickup assembly.

3. An apparatus, as set forth in claim 1, wherein said plurality of collector arms are attached to said frame member and arranged thereon in an arc about three quarters of a circle.

4. An apparatus, as set forth in claim 1, wherein said frame includes;
   a top frame member having a central opening;
   a spacer plate having a central opening and being positioned at a lower elevation than said collector arm plate;
   a stationary plate positioned intermediate said collector arm plate and said spacer plate; and
   a plurality of vertical frame members connected to said top frame member, stationary plate and spacer plate.

5. An apparatus, as set forth in claim 4, wherein said rotating pickup assembly is connected to said spacer plate.

6. An apparatus, as st forth in claim 1, wherein said means for automatically bringing said collector arms toward said rotating pickup assembly includes an air cylinder responsive to output signals from said computer means.

7. An apparatus, as set forth in claim 1, wherein said frame includes a grid, and including a motor supported on said grid with a shaft extending therefrom to said rotating carrier assembly.

8. An apparatus, as set forth in claim 1, including a motor attached to said frame, and a shaft extending from said motor to said rotating carrier assembly.

9. An apparatus, as set forth in claim 1, including a proximity switch actuator positioned on each of said collector arms.

10. An apparatus, as set forth in claim 1, including a collector head attached to the distal end of each of collector arm.

11. An apparatus, as set forth in claim 1, wherein said collector head has a groove with a depth sufficient for receiving and retaining a plurality of hangers.

12. An apparatus, as set forth in claim 1, including a stabilizer attached to the distal end of each of said collector arms.

13. An apparatus, as set forth in claim 12, wherein said stabilizer has a triangular configuration.

14. An apparatus, as set forth in claim 1, including a plurality of spacers attached to said spacer plate in an arcuate configuration and extending toward said collector arms.

15. An apparatus, as set forth in claim 1, wherein there are two spacers for each of said collector arms arranged side by side to receive and guide one of said collector arms therebetween.

16. An apparatus, as set forth in claim 1, wherein each of said spacers in constructed of metal with a nonmetallic sleeve.

17. An apparatus, as set forth in claim 1, wherein said rotating pickup assembly includes a plurality of carrier fingers.

18. An apparatus, as set forth in claim 1, including a solenoid for each carrier finger, said solenoid having a plunger movable between an extended position at which access to said finger is blocked and hangers cannot be placed on or removed from said finger, and a retracted position at which access to said finger is open and hangers can be placed on or removed from said finger.

19. An apparatus, as set forth in claim 18, including a deflector positioned near each of said fingers to intercept a hanger being removed from said finger and guiding said hanger onto said collector arm.

20. An apparatus, as set forth in claim 18, including a proximity switch associated with each of said collector arms and responsive to motion of said associated arm to actuate said solenoid.

21. An apparatus for assembling laundry, comprising:
   a frame;
   a rotating pickup assembly attached to said frame;
   computer means for receiving bar coded data signals and delivering control signals;
   means for scanning bar coded identification data from a randomly ordered stack of laundry tickets into said computer means, each ticket in said stack of randomly ordered laundry tickets having a separable tag portion bearing bar coded identification data associating each laundry ticket with at least one item of laundry;
   a rail for hanging said laundered items;
   means for scanning bar coded identification data for each item on said rail into said computer means, said computer means remembering the order in which items are scanned;

means for automatically delivering said laundered items one at a time from said rail to said rotating pickup assembly;

a plurality of collector arms attached to said frame and being movable, one at a time, toward and from said rotating pickup assembly in response to signals from said computer means;

means for removing said items form said rotating pickup assembly to said collector arms according to the identification data so that items may be assembled with the associated ticket without altering the rotational speed of said rotating pickup assembly.

22. An apparatus, as set forth in claim 21, wherein said rail includes:

an elongated hollow rail member having a longitudinal slot along a top portion thereof; and a slider member positioned inside said rail member and having a pin thereon protruding through said longitudinal slot to thereby engage a hanger, said slider member being movable between a first position at which said slider member is retracted and a second position at which said slider member is extended to deliver a hanger to said rotating pickup assembly.

23. An apparatus, as set forth in claim 21, wherein said rail has a ramp positioned to lift hangers off rail a preselected distance.

24. An apparatus, as set forth in claim 21, including means for effectuating movement of said slider between said first and second positions.

25. An apparatus, as set forth in claim 21, wherein said means for effectuating movement of said slider includes an air cylinder responsive to output signals from said computer.

26. An apparatus, as set forth in claim 21, including a J-hook supporting said rail member.

27. An apparatus for assembling laundry, comprising:
a frame;
a plurality of collector arms attached to said frame;
a rotating pickup assembly attached to said frame;
computer means for receiving data signals and delivering control signals;
means for inputting identification data from a randomly ordered stack of laundry tickets to said computer means;
means for inputting identification data for each laundered item to said computer means, said computer means remembering the order in which items are input;
means for automatically placing said laundered items onto said rotating pickup assembly, said laundered items each having a separable tag portion of a laundry ticket bearing identification data associating an item of laundry with one of said laundry tickets in said randomly ordered stack of laundry tickets;
means for automatically bringing said collector arms, one at a time, toward said rotating pickup assembly for receiving a laundered item;
means for automatically removing said laundered items from said rotating pickup assembly according to the identification data so that each group of items is assembled with its corresponding ticket without bringing the speed of said rotating pickup assembly to zero.

28. A method for assembling laundry, comprising:

laundering a plurality of items each having a separable tag portion of a laundry ticket bearing identification data associating an item of laundry with a laundry ticket;

arranging tickets for said plurality of items into a randomly ordered stack;

inputting identification data from said randomly ordered stack of tickets for said laundered items into a control computer;

inputting identification data for each laundered item into said control computer, said computer remembering the order in which items are input;

automatically delivering said input items onto a rotating pickup assembly;

bringing collector arms toward said rotating pickup assembly;

automatically removing said items from said rotating pickup assembly to said collector arms according to the identification data so that items are assembled with the associated ticket.

29. A method, as set forth in claim 28, including maintaining the rotational speed of said rotating pickup assembly.

30. A method, as set forth in claim 28, wherein inputting identification data includes scanning bar coded data.

31. A method for assembling laundry, comprising:

laundering a plurality of items each having a separable tag portion of a laundry ticket bearing identification data associating an item of laundry with a laundry ticket;

arranging tickets for said plurality of items into a randomly ordered stack;

inputting identification data from said randomly ordered stack of tickets for items in said lot into a control computer;

hanging said laundered items on a rail;

inputting identification data for each item on said rail into said control computer, said computer remembering the order in which items are input;

associating said randomly ordered stack of tickets with collector arms of a sorting apparatus with one ticket per arm with said tickets kept in the order in which they appear in said stack of tickets;

automatically delivering items, one at a time, from said rail to a rotating pickup assembly;

automatically bringing said collector arms, one at a time, toward said rotating pickup assembly;

automatically removing said items, one at a time, from said rotating pickup assembly to said collector arms according to the identification data so that each group of items is assembled with its corresponding ticket.

32. A method, as set forth in claim 31, maintaining the rotational speed of said rotating pickup assembly.

33. A method, as set forth in claim 31, wherein inputting identification data includes scanning bar coded data.

34. A method for assembling laundry, comprising:
receiving a plurality of groups of items to be laundered;
ticketing each group of items with a single ticket identifying the group and specifying the number of items in the group, said ticket having a number of separable tags equal to the number of items in the group, said ticket and said separable tags each having identification data;

tagging each item in each group with one of the separable tags from the ticket for the group;

arranging several groups of said plurality of groups into a lot for cleaning;

arranging tickets for said lot into a randomly ordered stack;

inputting identification data from said randomly ordered stack of tickets for items in said lot into a control computer;

laundering said items in said lot;

placing said laundered items in said lot on individual hangers;

hanging said assembled items on a rail;

inputting identification data for each item on said rail into said control computer, said computer remembering the order in which items are input;

associating said randomly ordered stack of tickets with collector arms of a sorting apparatus with one ticket per arm with said tickets kept in the order in which they appear in said stack of tickets;

automatically delivering items, one at a time, from said rail to a rotating pickup assembly;

bringing said collector arms, one at a time, toward said rotating pickup assembly in response to a signal from said control computer;

removing said items, one at a time, from said rotating pickup assembly to said collector arms according to the identification data so that each group of items is assembled with its corresponding single ticket.

35. A method, as set forth in claim 34, maintaining the rotational speed of said rotating pickup assembly.

36. A method, as set forth in claim 34, wherein inputting identification data includes scanning bar coded data.

* * * * *